United States Patent
Ford et al.

(10) Patent No.: US 6,417,296 B2
(45) Date of Patent: *Jul. 9, 2002

(54) PROCESS FOR PRODUCING POLYOLEFINS

(75) Inventors: Randal Ray Ford; Kenneth Alan Dooley; Jeffrey James Vanderbilt; Roxanna Lea Whitfield; Alan George Wonders, all of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/818,327

(22) Filed: Mar. 27, 2001

Related U.S. Application Data

(63) Continuation of application No. 09/386,826, filed on Aug. 31, 1999, now abandoned.
(60) Provisional application No. 60/126,886, filed on Mar. 30, 1999.

(51) Int. Cl.[7] .......................... C08F 2/34; C08F 10/00
(52) U.S. Cl. ................... 526/74; 526/142; 526/144; 526/204; 526/348; 526/348.2; 526/348.3; 526/348.4; 526/348.5; 526/901
(58) Field of Search .......................... 526/74, 135, 136, 526/142, 204, 348, 901, 144, 348.2, 348.3, 348.4, 348.5

(56) References Cited

U.S. PATENT DOCUMENTS

| | | | |
|---|---|---|---|
| 3,113,115 A | 12/1963 | Ziegler et al. | |
| 3,354,139 A | 11/1967 | Vandenberg | |
| 3,441,551 A * | 4/1969 | Jezl et al. ................. | 526/142 |
| 3,594,330 A | 7/1971 | Delbouille et al. | |
| 3,644,318 A | 2/1972 | Diedrich et al. | |
| 3,676,415 A | 7/1972 | Diedrich et al. | |
| 3,709,853 A | 1/1973 | Karapinka | |
| 3,917,575 A | 11/1975 | Matsuura et al. | |
| 4,003,712 A | 1/1977 | Miller | |
| 4,011,382 A | 3/1977 | Levine et al. | |
| 4,012,573 A | 3/1977 | Trieschmann et al. | |
| 4,076,698 A | 2/1978 | Anderson et al. | |
| 4,105,847 A | 8/1978 | Ito et al. | |
| 4,115,639 A * | 9/1978 | Brown et al. ............. | 526/142 X |
| 4,148,754 A | 4/1979 | Strobel et al. | |
| 4,187,385 A | 2/1980 | Iwao et al. | |
| 4,243,619 A * | 1/1981 | Fraser et al. ............. | 526/901 X |
| 4,256,866 A | 3/1981 | Krayannis et al. | |
| 4,293,673 A | 10/1981 | Hamer et al. | |
| 4,296,223 A | 10/1981 | Berger | |
| 4,298,713 A | 11/1981 | Morita et al. | |
| 4,302,565 A | 11/1981 | Goeke et al. | |
| 4,302,566 A | 11/1981 | Karol et al. | |
| 4,311,752 A | 1/1982 | Diedrich et al. | |
| 4,363,904 A | 12/1982 | Fraser et al. | |
| 4,481,301 A | 11/1984 | Nowlin et al. | |
| 4,532,311 A | 7/1985 | Fulks et al. | |
| 4,543,399 A | 9/1985 | Jenkins, III et al. | |
| 4,673,719 A | 6/1987 | Kioka et al. | |
| 4,716,206 A | 12/1987 | Fujita et al. | |
| 4,739,105 A | 4/1988 | Toyota et al. | |
| 4,792,592 A | 12/1988 | Fulks et al. | |
| 4,803,251 A | 2/1989 | Goode et al. | |
| 4,855,370 A | 8/1989 | Chirillo et al. | |
| 4,876,320 A | 10/1989 | Fulks et al. | |
| 4,882,400 A | 11/1989 | Dumain et al. | |
| 4,981,930 A | 1/1991 | Funabashi et al. | |
| 5,026,795 A | 6/1991 | Hogan | |
| 5,034,479 A | 7/1991 | Eisinger et al. | |
| RE33,683 E | 9/1991 | Allen et al. | |
| 5,055,535 A | 10/1991 | Spitz et al. | |
| 5,162,463 A | 11/1992 | Baker et al. | |
| 5,194,526 A | 3/1993 | Hussein et al. | |
| 5,200,477 A | 4/1993 | Baker et al. | |
| 5,210,161 A * | 5/1993 | Smith et al. ............. | 526/142 X |
| 5,229,076 A | 7/1993 | Fagher | |
| 5,283,278 A | 2/1994 | Daire et al. | |
| 5,352,749 A | 10/1994 | DeChellis et al. | |
| 5,385,991 A | 1/1995 | Yamaguchi et al. | |
| 5,410,002 A | 4/1995 | Govoni et al. | |
| 5,416,175 A | 5/1995 | Song et al. | |
| 5,420,220 A * | 5/1995 | Cheruvu et al. ......... | 526/901 X |
| 5,432,236 A | 7/1995 | Sano et al. | |
| 5,470,812 A | 11/1995 | Mink et al. | |
| 5,541,270 A | 7/1996 | Chinh et al. | |
| 5,625,012 A | 4/1997 | Hussein et al. | |
| 5,677,375 A | 10/1997 | Rifi et al. | |
| 5,731,392 A | 3/1998 | Ali et al. | |
| 5,780,379 A | 7/1998 | Fiasse | |
| 5,834,571 A | 11/1998 | Bernier et al. | |
| 5,948,872 A | 9/1999 | Kioka et al. | |
| 6,300,432 B1 * | 10/2001 | Ford et al. ............... | 526/142 X |

FOREIGN PATENT DOCUMENTS

| BE | 839380 | 9/1976 |
|---|---|---|
| CA | 991798 | 6/1976 |
| EP | 0 313 087 A1 | 4/1989 |
| EP | 0 359 444 A1 | 3/1990 |
| EP | 0 614 917 A1 | 9/1994 |
| EP | 0 703 246 A1 | 3/1996 |
| EP | 0 529 977 B1 | 4/1998 |

OTHER PUBLICATIONS

US 5,883,203, 03/1999, Chevruvu et al. (withdrawn)
*Chemical & Engineering News*, 1985, p. 27, vol. 63, Issue 5.

* cited by examiner

*Primary Examiner*—Fred Teskin
(74) *Attorney, Agent, or Firm*—Bernard J. Graves, Jr.; Jonathan D. Wood; Lawrence A. Chaletsky

(57) ABSTRACT

A novel process for producing homopolymers and interpolymers of olefins which involves contacting an olefin and/or an olefin and at least one or more other olefin(s) under polymerization conditions with a Ziegler-Natta catalyst comprising at least one transition metal compound and at least one organometallic co-catalyst compound and tetrahydrofuran in amounts sufficient to reduce the electrostatic charge in the polymerization medium. Also disclosed is a process for reducing electrostatic charge in an olefin polymerization medium.

55 Claims, No Drawings

PROCESS FOR PRODUCING POLYOLEFINS

CROSS-REFERENCE TO RELATED APPLICATION

This is a continuation of application Ser. No. 09/386,826 filed on Aug. 31, 1999, now abandoned, which application claims priority under 35 U.S.C. §119(e) to U.S. Provisional Application Ser. No. 60/126,886, filed Mar. 30, 1999.

FIELD OF THE INVENTION

The present invention relates to a polymerization process for the production of polyolefins utilizing a Ziegler-Natta catalyst and tetrahydrofuran (THF) in amounts sufficient to reduce the electrostatic charge in the polymerization reactor. The use of THF as a catalytic agent further provides polyolefins that are suitable for molding and film applications.

BACKGROUND OF INVENTION

Polyolefins such as polyethylene are well known and are useful in many applications. In particular, linear polyethylene polymers possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polyethylene and polypropylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Ziegler-Natta catalysts for the polymerization of olefins are well known in the art and have been known at least since the issuance of U.S. Pat. No. 3,113,115. Thereafter, many patents have been issued relating to new or improved Ziegler-Natta catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and Reissue 33,683.

These patents disclose Ziegler-Natta catalysts that are well known as typically consisting of a transition metal component and a co-catalyst that is typically an organoaluminum compound. Optionally used with the catalyst are activators such as halogenated hydrocarbons and activity modifiers such as electron donors.

The use of halogenated hydrocarbons with Ziegler-Natta polymerization catalysts in the production of polyethylene is disclosed in U.S. Pat. No. 3,354,139 and European Patent Nos. EP 0 529 977 B1 and EP 0703 246 A1. As disclosed, the halogenated hydrocarbons may reduce the rate of ethane formation, improve catalyst efficiency, or provide other effects. Typical of such halogenated hydrocarbons are monohalogen and polyhalogen substituted saturated or unsaturated aliphatic, alicyclic, or aromatic hydrocarbons having 1 to 12 carbon atoms. Exemplary aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, 1,2-dichloroethane, 1,2-dibromoethane, methylchloroform, perchloroethylene and the like. Exemplary alicyclic compounds include chlorocyclopropane, tetrachlorocyclopentane and the like. Exemplary aromatic compounds include chlorobenzene, hexabromobenzene, benzotrichloride and the like. These compounds may be used individually or as mixtures thereof.

It is also well known, in the polymerization of olefins, particularly where Ziegler-Natta catalysts are employed, to utilize, optionally, electron donors. Such electron donors often aid in increasing the efficiency of the catalyst and/or in controlling the stereospecificity of the polymer when an olefin, other than ethylene, is polymerized. Electron donors, typically known as Lewis Bases, when employed during the catalyst preparation step are referred to as internal electron donors. Electron donors when utilized other than during the catalyst preparation step are referred to as external electron donors. For example, the external electron donor may be added to the preformed catalyst, to the prepolymer, and/or to the polymerization medium.

The use of electron donors in the field of propylene polymerization is well known and is primarily used to reduce the atactic form of the polymer and increase the production of the isotactic polymers. The use of electron donors generally improves the productivity of the catalyst in the production of isotactic polypropylene. This is shown generally in U.S. Pat. No. 4,981,930.

In the field of ethylene polymerization, where ethylene constitutes at least about 50% by weight of the total monomers present in the polymer, electron donors are utilized to control the molecular weight distribution (MWD) of the polymer and the activity of the catalyst in the polymerization medium. Exemplary patents describing the use of internal electron donors in producing polyethylene are U.S. Pat. Nos. 3,917,575; 4,187,385, 4,256,866; 4,293,673; 4,296,223; Reissue 33,683; 4,302,565; 4,302,566; and 5,470,812. The use of an external monoether electron donor, such as tetrahydrofuran (THF), to control molecular weight distribution is shown in U.S. Pat. No. 5,055,535; and the use of external electron donors to control the reactivity of catalyst particles is described in U.S. Pat. No. 5,410,002.

Illustrative examples of electron donors include carboxylic acids, carboxylic acid esters, alcohols, ethers, ketones, amines, amides, nitrites, aldehydes, thioethers, thioesters, carbonic esters, organosilicon compounds containing oxygen atoms, and phosphorus, arsenic or antimony compounds connected to an organic group through a carbon or oxygen atom.

A generally encountered problem in polymerization processes, in particular gas phase polymerization processes, is the formation of agglomerates. Agglomerates can form in various places such as the polymerization reactor and the lines for recycling the gaseous stream. As a consequence of agglomerate formation it may be necessary to shut down the reactor.

When agglomerates form within the polymerization reactor there can be many adverse effects. For example, the agglomerates can disrupt the removal of polymer from the polymerization reactor by plugging the polymer discharge system. Further, if the agglomerates fall and cover part of the fluidization grid a loss of fluidization efficiency may occur. This can result in the formation of larger agglomerates which can lead to the loss of the entire fluidized bed. In either case there may be the necessity for the shutdown of the reactor.

It has been found that agglomerates may be formed as a result of the presence of very fine polymer particles in the polymerization medium. These fine polymer particles may be present as a result of introducing fine catalyst particles or breakage of the catalyst within the polymerization medium.

These fine particles are believed to deposit onto and electrostatically adhere to the inner walls of the polymerization reactor and the associated equipment for recycling the gaseous stream such as, for example, the heat exchanger. If the fine particles remain active, and the polymerization reaction continues, then the particles will grow in size resulting in the formation of agglomerates. These agglomerates when formed within the polymerization reactor tend to be in the form of sheets.

Several solutions have been proposed to resolve the problem of formation of agglomerates in gas phase polymerization processes. These solutions include the deactivation of the fine polymer particles, control of the catalyst activity and the reduction of the electrostatic charge. Exemplary of the solutions are as follows.

European Patent Application 0 359 444 A1 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous oxygen containing compounds or liquid or solid active-hydrogen containing compounds to prevent the adhesion of the polymer to itself or to the inner wall of the polymerization apparatus.

In U.S. Pat. No. 4,803,251 there is described a process for reducing sheeting utilizing a group of chemical additives which generate both positive and negative charges in the reactor, and which are fed to the reactor in an amount of a few parts per million(ppm) per part of the monomer in order to prevent the formation of undesired positive or negative charges.

Other processes and other additives that may be used to neutralize electrostatic charge in the fluidized-bed reactor are found in U.S. Pat. Nos. 4,792,592; 4,803,251; 4,855,370; 4,876,320; 5,162,463; 5,194,526 and 5,200,477.

Additional processes for reducing or eliminating electrostatic charge include (1) installation of grounding devices in a fluidized bed, (2) ionization of gas or particles by electrical discharge to generate ions which neutralize the electrostatic charge on the particles and (3) the use of radioactive sources to produce radiation capable of generating ions which neutralize the electrostatic charge on the particles.

It would be desirable therefore to provide a process for producing polyolefins, particularly polyethylene, wherein the problems associated with the electrostatic charge are reduced.

SUMMARY OF THE INVENTION

The polymerization process of the present invention comprises the introduction into a polymerization medium comprising an olefin, particularly ethylene, and optionally at least one or more other olefin(s), at least one Ziegler-Natta catalyst comprised of a component comprising at least one transition metal and a co-catalyst comprising at least one organometallic compound, and tetrahydrofuran (THF), wherein the THF is present in an amount sufficient to reduce the electrostatic charge in the polymerization medium to a level lower than would occur in the same polymerization process in the absence of THF.

The present invention also relates to a process for reducing electrostatic charge in the polymerization of an olefin, particularly ethylene, and optionally at least one or more other olefin(s) in a polymerization medium, particularly gas phase, in the presence of at least one Ziegler-Natta catalyst comprised of a component comprising at least one transition metal and a co-catalyst comprising at least one organometallic compound, and THF, comprising introducing the THF into the polymerization medium in an amount sufficient to reduce the electrostatic charge in the polymerization medium to a level lower than would occur in the same polymerization process in the absence of the THF.

Optionally a halogenated hydrocarbon may be added to the polymerization medium.

The THF, the co-catalyst defined herein, and the optional halogenated hydrocarbon may be added to the polymerization medium in any manner. The THF, the halogenated hydrocarbon, and/or the co-catalyst defined herein may be added to the catalyst just prior to addition to the polymerization medium, or added separately from the catalyst to the polymerization medium in any manner known in the art. For example, the THF may optionally be premixed with the co-catalyst prior to addition to the polymerization medium.

If a gas phase fluidized bed process is utilized for polymerization of the olefin, it may be advantageous to add the THF prior to the heat removal means, e.g., the heat exchanger, to slow the rate of fouling of said heat removal means in addition to reducing the electrostatic charge in the polymerization reactor.

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

The polymerization process of the present invention comprises the introduction into a polymerization medium comprising an olefin, particularly ethylene, and optionally at least one or more other olefin(s), at least one Ziegler-Natta catalyst comprised of a component comprising at least one transition metal and a co-catalyst comprising at least one organometallic compound, and tetrahydrofuran (THF), wherein the THF is present in an amount sufficient to reduce the electrostatic charge in the polymerization medium to a level lower than would occur in the same polymerization process in the absence of THF.

The present invention also relates to a process for reducing electrostatic charge in the polymerization of an olefin, particularly ethylene, and optionally at least one or more other olefin(s) in a polymerization medium, particularly gas phase, in the presence of at least one Ziegler-Natta catalyst comprised of a component comprising at least one transition metal and a co-catalyst comprising at least one organometallic compound, and THF, comprising introducing the THF into the polymerization medium in an amount sufficient to reduce the electrostatic charge in the polymerization medium to a level lower than would occur in the same polymerization process in the absence of the THF.

Optionally a halogenated hydrocarbon may be added to the polymerization medium.

The co-catalyst used in the process of the present invention can be any organometallic compound, or mixtures thereof, that can activate the transition metal component in a Ziegler-Natta catalyst in the polymerization of olefins. In particular, the organometallic co-catalyst compound that is reacted with the transition metal component contains a metal selected from Groups 1, 2, 11, 12, 13 and/or 14 of the above described Periodic Table of the Elements. Exemplary of such metals are lithium, magnesium, copper, zinc, boron, silicon and the like, or mixtures thereof.

Preferably the organometallic co-catalyst compound is at least one compound of the formula, $$X_nER_{3-n},$$

or mixtures thereof,
wherein
X is hydrogen, halogen, or mixtures of halogens, selected from fluorine, chlorine, bromine and iodine;
n ranges from 0 to 2;
E is an element from Group 13 of the Periodic Table of Elements such as boron, aluminum and gallium; and
R is a hydrocarbon group, containing from 1 to 100 carbon atoms and from 0 to 10 oxygen atoms, connected to the Group 13 element by a carbon or oxygen bond.

Exemplary of the R group suitable for use herein is $C_{1-100}$ alkyl, $C_{1-100}$ alkoxy, $C_{2-100}$ alkenyl, $C_{4-100}$ dienyl, $C_{3-100}$ cycloalkyl, $C_{3-100}$ cycloalkoxy, $C_{3-100}$ cycloalkenyl, $C_{4-100}$ cyclodienyl, $C_{6-100}$ aryl, $C_{7-100}$ aralkyl, $C_{7-100}$ aralkoxy and $C_{7-100}$ alkaryl. Also exemplary of the R group are hydrocarbons containing from 1 to 100 carbon atoms and from 1 to 10 oxygen atoms.

Exemplary of the co-catalyst compounds used in the process of the present invention where n=0 are trimethylaluminum; triethylborane; triethylgallane; triethylaluminum; tri-n-propylaluminum; tri-n-butylaluminum; tri-n-pentylaluminum; triisoprenylaluminum; tri-n-hexylaluminum; tri-n-heptylaluminum; tri-n-octylaluminum; triisopropylaluminum; triisobutylaluminum; tris(cylcohexylmethyl)aluminum; dimethylaluminum methoxide; dimethylaluminum ethoxide; diethylaluminum ethoxide and the like. Exemplary of compounds where n=1 are dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl) aluminum chloride; diethylaluminum fluoride; diethylaluminum bromide; diethylaluminum iodide; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis (cylcohexylmethyl)aluminum hydride; chloromethylaluminum methoxide; chloromethylaluminum ethoxide; chloroethylaluminum ethoxide and the like. Exemplary of compounds where n=2 are methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride and the like. Also exemplary are alkylaluminum sesquialkoxides such as methylaluminum sesquimethoxide; ethylaluminum sesquiethoxide; n-butylaluminum sesqui-n-butoxide and the like. Also exemplary are alkylaluminum sesquihalides such as methylaluminum sesquichloride; ethylaluminum sesquichloride; isobutylaluminum sesquichloride; ethylaluminum sesquifluoride; ethylaluminum sesquibromide; ethylaluminum sesquiiodide and the like.

Preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum; and dialkylaluminum halides such as dimethylaluminum chloride, diethylaluminum chloride, dibutylaluminum chloride, diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum sesquiiodide.

Most preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum and dialkylaluminum halides such as dimethylaluminum chloride, diethylaluminum chloride, dibutylaluminum chloride, diisobutylaluminum chloride and alkylaluminum sesquihalides such as methylaluminum sesquichloride, ethylaluminum sesquichloride, n-butylaluminum sesquichloride and isobutylaluminum sesquichloride.

Mixtures of compounds of the above formula $X_nER_{3-n}$ also can be utilized herein as the co-catalyst.

Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon atoms.

Preferred for use in the process of the present invention are dichloromethane; dibromomethane; chloroform; carbon tetrachloride; bromochloromethane; chlorofluoromethane; bromodichloromethane; chlorodifluromethane; fluorodichloromethane; chlorotrifluoromethane; fluorotrichloromethane; 1,2-dichloroethane; 1,2-dibromoethane; 1-chloro-1-fluoroethane; 1-chloro-1,1-difluoroethane; 1-chloro-1,2-difluoroethane; 2-chloro-1,1-difluoroethane; 1,1,1,2-tetrafluoroethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane; hexachloroethane; chloropentafluoroethane; 1,2-dibromotetrachloroethane; 1,1,2,2-tetrachloroethylene; 1-chloro-1,2,2-trifluorothylene; 1-fluoro-1,2,2-trichloroethylene; hexafluoropropene; hexachlorocyclopentadiene and hexachloropropene.

Most preferred for use in the process of the present invention are dichloromethane; chloroform; carbon tetrachloride; chlorofluoromethane; chlorodifluromethane; dichlorodifluoromethane, fluorodichloromethane; chlorotrifluoromethane; fluorotrichloromethane; 1,2-dichloroethane; 1,2-dibromoethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane; hexachloroethane; hexafluoropropene ; hexachlorocyclopentadiene and hexachloropropene.

The halogenated hydrocarbons may be used individually or as mixtures thereof.

The polymerization process of the present invention may be carried out using any suitable process, for example, solution, slurry and gas phase. A particularly desirable method for producing polyolefin polymers according to the present invention is a gas phase polymerization process preferably utilizing a fluidized bed reactor. This type reactor and means for operating the reactor are well known and completely described in U.S Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 150° C. In general, the reactor temperature is operated at the highest temperature that is feasible taking into account the sintering temperature of the polymer product within the reactor.

The process of the present invention is suitable for the production of homopolymers of olefins, particularly ethylene, and/or copolymers, terpolymers, and the like, of olefins, particularly ethylene, and at least one or more other olefin(s). Preferably the olefins are alpha-olefins. The olefins, for example, may contain from 2 to 16 carbon atoms. Particularly preferred for preparation herein by the process of the present invention are polyethylenes. Such polyethylenes are preferably homopolymers of ethylene and interpolymers of ethylene and at least one alpha-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

The polymerization reaction of the present invention is carried out in the presence of a Ziegler-Natta catalyst comprising at least one transition metal component and at least one organometallic co-catalyst component. In the process of the invention, the catalyst components can be introduced in any manner known in the art. For example, the catalyst components can be introduced directly into the polymerization medium in the form of a solution, a slurry or a dry free flowing powder. The catalyst components can be premixed to form an activated catalyst prior to addition to the polymerization medium; the components can be added separately to the polymerization medium; or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst. Furthermore during the polymerization reaction being carried out in the presence of the Ziegler-Natta catalyst, as above described, there may be added additional organometallic co-catalyst compound(s). The additional organometallic co-catalyst compound may be the same or different from that used to form the Ziegler-Natta catalyst.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal selected from Groups 4, 5, 6, 7, 8, 9 and/or 10 of the Periodic Table of the Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

Any or all of the components of the Ziegler-Natta catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $SiO_2$, $Al_2O_3$ or mixtures thereof as a main component are preferred.

Examples of suitable organic carriers include polymers such as, for example, polyethylene, polypropylene, interpolymers of ethylene and alpha-olefins, polystyrene, and functionalized polystyrene.

In the event that the catalyst is to be used in prepolymer form, the organometallic co-catalyst compound used to form the prepolymer can be any organometallic compound comprising a metal of Groups 1, 2, 11, 12, 13 and 14 of the above described Periodic Table of the Elements. Exemplary of such metals are lithium, magnesium, copper, zinc, boron, silicon and the like. When a prepolymer is employed in the polymerization medium, additional organometallic co-catalyst(s) if utilized, may be the same or different as that utilized in preparing the prepolymer. The THF and/or the halogenated hydrocarbon can be added to the prepolymer.

The catalyst may contain conventional components in addition to the transition metal component and the co-catalyst component. For example, there may be added any magnesium compound, halogenated hydrocarbon and the like.

Furthermore there may be added to the catalyst any internal electron donor. The internal electron donor compound preferably is selected from the group consisting of ethers, thioethers, esters, thioesters, amines, amides, ketones, nitrites, phosphines, silanes, acid anhydrides, acid halides, acid amides, aldehydes, and organic acid derivatives. More preferred as internal electron donors are compounds containing from 1 to 50 carbon atoms and from 1 to 30 heteroatoms of an element, or mixtures thereof, selected from Groups 14, 15, 16 and 17 of the Periodic Table of Elements.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

In carrying out the polymerization process of the present invention, the co-catalyst(s) is added to the polymerization medium in any amount sufficient to effect production of the desired polyolefin. It is preferred to utilize the co-catalyst(s) in a molar ratio of co-catalyst(s) to transition metal component(s) of the Ziegler-Natta catalyst ranging from about 0.5:1 to about 100:1. In a more preferred embodiment, the molar ratio of co-catalyst(s) to transition metal component(s) ranges from about 0.5:1 to about 50:1.

In carrying out the polymerization process of the present invention the THF is added in any manner. For example, the THF may be added to the preformed catalyst, to the prepolymer during the prepolymerization step, to the preformed prepolymer and/or to the polymerization medium. The THF may optionally be premixed with the co-catalyst. The THF is added in any amount sufficient to reduce the electrostatic charge in the polymerization medium to a level lower than would occur in the same polymerization process in the absence of the THF. It is preferred to incorporate the THF in a molar ratio of THF to transition metal component of the Ziegler-Natta catalyst ranging from about 0.01:1 to about 100:1. In a more preferred embodiment, the molar ratio of THF to transition metal component ranges from about 0.1:1 to about 50:1.

In carrying out the polymerization process of the present invention, the halogenated hydrocarbon may be added to the polymerization medium in any amount sufficient to effect production of the desired polyolefin. It is preferred to incorporate the halogenated hydrocarbon in a molar ratio of halogenated hydrocarbon to transition metal component of the Ziegler-Natta catalyst ranging from about 0.001:1 to about 100:1. In a more preferred embodiment, the molar ratio of halogenated hydrocarbon to transition metal component ranges from about 0.001:1 to about 10:1.

The molecular weight of the polyolefin produced by the present invention can be controlled in any known manner, for example, by using hydrogen. The molecular weight control of polyethylene, for example, may be evidenced by an increase in the melt index ($I_2$) of the polymer when the molar ratio of hydrogen to ethylene in the polymerization medium is increased.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyolefins, particularly polyethylenes, of the present invention may be fabricated into films by any technique known in the art. For example, films may be produced by the well known cast film, blown film and extrusion coating techniques.

Further, the polyolefins, particularly polyethylenes, may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. All U.S. patents referred to herein are incorporated by reference in their entirety.

EXAMPLES

In the following examples the test procedures listed below were used in evaluating the analytical properties of the polyolefins herein.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) Residual Titanium Content in the Product. The residual titanium content in the product is measured by X-Ray Fluorescence Spectroscopy (XRF) using a Philips Sequential X-Ray Spectrometer Model PW 1480. The samples of the polymer to be evaluated were compression molded into a circular shaped plaque approximately 43 mm in diameter so as to fit the sample holder on the spectrometer and 3 to 5 mm in thickness and having a smooth flat surface. The molded test specimens were then placed in the XRF unit and the x-ray fluorescence arising from the titanium in the test specimen was measured. The residual titanium content was then determined based on a calibration curve obtained by measurements from polyethylene calibration specimens containing a known amount of titanium. The residual titanium content is reported as parts per million (ppm) relative to the polymer matrix.

Ziegler-Natta Catalysts Utilized in the Examples

The Ziegler-Natta catalyst used in Examples 1, 2 and 3 was prepared in accordance with Example 1-a of European Patent Application EP 0 703 246 A1. The catalyst was used in prepolymer form and was prepared in accordance with Example 1-b of European Patent Application EP 0 703 246 A1. A prepolymer containing about 34 grams of polyethylene per millimole of titanium was thus obtained. This catalyst is herein referred to as Catalyst I.

The Ziegler-Natta catalyst used in Examples 4 and 5 was obtained from Toho Titanium Company, Limited under the product name THC-C. The catalyst was a titanium-based catalyst supported on magnesium chloride. This catalyst is herein referred to as Catalyst II.

The Ziegler-Natta catalyst used in Example 6 was obtained from Grace Davison, Baltimore, Md. under the product name XPO-5021. The catalyst was a titanium-based catalyst supported on silica. This catalyst is herein referred to as Catalyst III.

Polymerization Process

The polymerization process utilized in Examples 1–6 herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, an olefin such as 1-butene, 1-pentene and 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.0 feet per second.

In Examples 1–3 the Ziegler-Natta catalyst, Catalyst I, as described above in prepolymer form, was introduced intermittently into the reactor. The said catalyst contained magnesium, chlorine and titanium. The prepolymer form contained about 34 grams of polyethylene per millimole of titanium and an amount of tri-n-octylaluminum (TnOA) such that the molar ratio, Al/Ti, ranged from 0.9:1 to about 1.0:1. In Examples 4 and 5 the Ziegler-Natta catalyst, Catalyst II, supplied by Toho Titanium Company, Limited was introduced directly into the reactor without having been formed into a prepolymer. In Example 6 the Ziegler-Natta catalyst, Catalyst III, supplied by Grace Davison was introduced directly into the reactor without having been formed into a prepolymer. The rate of introduction of the prepolymer or catalyst into the reactor was adjusted for each given set of conditions in achieving the desired production rate. During the polymerization the co-catalyst was introduced continuously into the line for recycling the gaseous reaction mixture, at a point situated downstream of the heat transfer means. The feed rate of co-catalyst is expressed as a molar ratio of trialkylaluminum to titanium (Al/Ti), and is defined as the ratio of the co-catalyst feed rate (in moles of trialkylaluminum per hour) to the catalyst or prepolymer feed rate (in moles of titanium per hour). Optionally, a solution of chloroform ($CHCl_3$) in n-hexane, at a concentration of about 0.5 weight percent, was introduced continuously into the line for recycling the gaseous reaction mixture. The feed rate of the halogenated hydrocarbon is expressed as a molar ratio of $CHCl_3$ to titanium ($CHCl_3$/Ti), and is defined as the ratio of the $CHCl_3$ feed rate (in moles of $CHCl_3$ per hour) to the catalyst or prepolymer feed rate (in moles of titanium per hour).

Tetrahydrofuran (THF), when utilized in Examples 1–6, was used to reduce the electrostatic charge in the polymerization medium. A solution of THF in n-hexane, at a concentration of about 1 weight percent, can be introduced continuously into the line for recycling the gaseous reaction mixture. The feed rate of THF is expressed as a molar ratio of THF to titanium (THF/Ti), and is defined as the ratio of the THF feed rate (in moles of THF per hour) to the catalyst or prepolymer feed rate (in moles of titanium per hour).

The level of electrostatic charge of the fluidized bed was measured by a Correflow Model 3400 Electrostatic Monitor (ESM) supplied by Auburn International, Inc. of Danvers, Mass. The electrostatic probe was installed in the vertical cylindrical section of the reactor at a height such as to be within the fluidized bed of polymer particles. The electrostatic probe measures the current flow between the polymerization medium and the ground. A reduction in electrostatic charge is defined as a reduction in the absolute magnitude of the measured current and/or a reduction in the variability of the measured current.

Example 1 (Comparative)

Preparation of an Ethylene/1-Hexene Interpolymer with Catalyst I without the Addition of THF The process conditions and resin properties are given in Table 1. The molar ratio of $CHCl_3$ to titanium was 0.03. The process was conducted without the addition of THF. 1-Hexene was used as comonomer. Under these conditions a polyethylene free from agglomerate was withdrawn from the reactor at a rate of 210lb/h (pounds per hour). The ethylene/1-hexene interpolymer had a density of 0.918 g/cc, a melt index $MI_{2.16}$, $I_2$, of 0.9 dg/min and a residual titanium level of 10.5 ppm.

The level of electrostatic charge in the fluidized bed was measured as described above.

Example 2

Preparation of an Ethylene/1-Hexene Interpolymer with Catalyst I with Addition of THF The process conditions and resin properties are given in Table 1. The molar ratio of trimethylaluminum (TMA) to titanium was 6:1. The molar ratio of $CHCl_3$ to titanium was 0.04:1. The process was conducted with the addition of THF. The molar ratio of THF to titanium was 3:1. 1-Hexene was used as comonomer. Under these conditions a polyethylene free from agglomerate was withdrawn from the reactor at a rate of 221 lb/h. The ethylene/1-hexene interpolymer had a density of 0.917 g/cc, a melt index $MI_{2.16}$, $I_2$, of 0.9 dg/min and a residual titanium level of 5.2 ppm.

The level of electrostatic charge in the fluidized bed was measured as described above. It was found that the addition of THF reduced the level of electrostatic charge in the fluidized bed as compared to the level measured in Example 1.

Example 3

Preparation of an Ethylene/1-Hexene Interpolymer with Catalyst I with Addition of THF The process conditions and resin properties are given in Table 1. The molar ratio of trimethylaluminum (TMA) to titanium was 6:1. The molar ratio of $CHCl_3$ to titanium was 0.05:1. The process was conducted with the addition of THF. The molar ratio of THF to titanium was 7:1. 1-Hexene was used as comonomer. Under these conditions a polyethylene free from agglomerate was withdrawn from the reactor at a rate of 205 lb/h. The ethylene/1-hexene interpolymer had a density of 0.918 g/cc, a melt index $MI_{2.16}$, $I_2$, of 1.0 dg/min and a residual titanium level of 14.1 ppm.

The level of electrostatic charge in the fluidized bed was measured as described above. It was found that the addition of a larger quantity of THF than was present in Example 2 reduced the level of electrostatic charge as compared to the level measured in Example 2.

Example 4 (Comparative)

Preparation of an Ehtlyene/1-Hexene Interpolymer with Catalyst II without the Addition of THF The process conditions and resin properties are given in Table 1. The molar ratio of trimethylaluminum (TMA) to titanium was 30:1. The process was conducted without the addition of THF. 1-Hexene was used as comonomer. Under these conditions a polyethylene free from agglomerate was withdrawn from the reactor at a rate of 229 lb/h. The ethylene/1-hexene had a density of 0.918 g/cc, a melt index $MI_{2.16}$, $I_2$, of 0.9 dg/min and a residual titanium level of 0.8 ppm.

The level of electrostatic charge in the fluidized bed was measured as described above.

Example 5

Preparation of an Ethylene/1-Hexene Interpolymer with Catalyst II with Addition of THF The process conditions and resin properties are given in Table 1. The molar ratio of trimethylaluminum (TMA) to titanium was 19:1. The molar ratio of $CHCl_3$ to titanium was 0.06:1. The process was conducted with the addition of THF. The molar ratio of THF to titanium was 2.5:1. 1-Hexene was used as comonomer. Under these conditions a polyethylene free from agglomerate was withdrawn from the reactor at a rate of 201 lb/h. The ethylene/l-hexene interpolymer had a density of 0.918 g/cc, a melt index $MI_{2.16}$, $I_2$, of 0.8 dg/min and a residual titanium level of 1.1 ppm.

The level of electrostatic charge in the fluidized bed was measured as described above. It was found that the addition of THF reduced the level of electrostatic charge in the fluidized bed as compared to the level measured in Example 4.

TABLE 1

Reactor Conditions and Resin Properties for Examples 1 through 5

|  | Example | | | | |
| --- | --- | --- | --- | --- | --- |
|  | 1 | 2 | 3 | 4 | 5 |
| Reactor Pressure (psig) | 287 | 284 | 287 | 295 | 294 |
| Reactor Temperature (° C.) | 86 | 86 | 86 | 85 | 85 |
| Fluidization Velocity (ft/sec) | 1.75 | 1.63 | 1.71 | 1.78 | 1.85 |
| Fluidized Bulk Density (lb/ft$^3$) | 16.0 | 17.6 | 17.6 | 17.1 | 18.1 |
| Reactor Bed Height (ft) | 11 | 16 | 16 | 10 | 10 |
| Ethylene ($C_2$) (mole %) | 39.4 | 29.3 | 29.0 | 27.7 | 25.2 |
| $H_2/C_2$ (molar ratio) | 0.163 | 0.129 | 0.162 | 0.210 | 0.283 |
| 1-Hexene/$C_2$ (molar ratio) | 0.135 | 0.154 | 0.173 | 0.175 | 0.193 |
| Catalyst Number | I | I | I | II | II |
| Co-catalyst | — | TMA | TMA | TMA | TMA |
| Al/Ti (molar ratio) | 0 | 6 | 6 | 30 | 19 |
| THF | — | THF | THF | — | THF |
| THF/Ti (molar ratio) | 0 | 3 | 7 | 0 | 2.5 |
| $CHCl_3$/Ti | 0.03 | 0.04 | 0.05 | 0 | 0.06 |
| Production Rate (lb/h) | 210 | 221 | 205 | 229 | 201 |
| Space Time Yield (kg/h-m$^3$) | 67.4 | 48.0 | 45.1 | 78.3 | 72.8 |
| Residual Titanium (ppm) | 10.5 | 5.2 | 14.1 | 0.8 | 1.1 |
| Density (g/cc) | 0.918 | 0.917 | 0.918 | 0.918 | 0.918 |
| Melt Index, $I_2$, (dg/min) | 0.9 | 0.9 | 1.0 | 0.9 | 0.8 |

Example 6

Preparation of an Ethylene/1-Hexene Interpolymer with Catalyst III with and without the Addition of THF In this example a comparison was made with and without the addition of tetrahydrofuran (THF) to illustrate the effect on electrostatic charge in the polymerization medium for a process for polymerizing olefins. The olefins were ethylene and 1-hexene. The molar ratio of triethylaluminum (TEAL) to titanium was 31:1. In carrying out the example the polymerization conditions were as follows:

| | |
|---|---|
| Reactor Pressure | 295 psig |
| Reactor Temperature | 83° C. |
| Fluidization Velocity | 1.94 ft/sec |
| Fluidized Bulk Density | 15.7 lb/ft³ |
| Reactor Bed Height | 11 ft |
| Ethylene (C₂) Mole % | 40.3 |
| H₂/C₂ Molar Ratio | 0.510 |
| 1-Hexene/C₂ Molar Ratio | 0.103 |
| TEAL/Ti Molar Ratio | 31 |

With the addition of THF to titanium at a molar ratio of 10:1, the production rate was 184 lb/h and the space time yield was 58 kg/(h-m³). The ethylene/1-hexene interpolymer had a density of 0.918 g/cc, a melt index $MI_{2.16}$, $I_2$, of 3.4 dg/min and a residual titanium level of 0.6 parts per million. The level of electrostatic charge in the fluidized bed was measured as described above.

For the purpose of establishing the effect resulting from the addition of THF to reduce the electrostatic charge in the polymerization medium, the addition of the THF to the polymerization medium was stopped. Without the addition of THF to the polymerization medium, the level of electrostatic charge in the fluidized bed was measured as described above. It was observed from the measurements that the level of electrostatic charge was reduced as a result of the presence of the THF in the polymerization medium.

Examples 7

Preparation of HDPE with Catalyst III with Addition of THF

The process of Example 6 is followed with the exception that a homopolymer of ethylene, known as high density polyethylene (HDPE), is produced. The level of electrostatic charge in the polymerization medium is expected to be reduced as a result of incorporating the THF in the polymerization medium.

Examples 8–12

Preparation of Ethylene/Olefin Interpolymers with Catalyst III with Addition of THF The process of Example 6 is followed with the exception that in place of the 1-hexene is there is utilized the following comonomers:

| | |
|---|---|
| Example 8 | propylene, |
| Example 9 | 1-butene, |
| Example 10 | 1-pentene, |
| Example 11 | 4-methylpent-1-ene, |
| Example 12 | 1-octene. |

In each of the above Examples 8–12 the level of electrostatic charge in the polymerization medium is expected to be reduced as a result of incorporating THF in the polymerization medium.

Films are prepared from the polyolefins of the present invention.

Articles such as molded items are also prepared from the polyolefins of the present invention.

It should be clearly understood that the forms of the invention herein described are illustrative only and are not intended to limit the scope of the invention. The present invention includes all modifications falling within the scope of the following claims.

We claim:

1. A process for polymerizing an olefin and/or an olefin and at least one or more other olefin(s) comprising contacting, under polymerization conditions, in a polymerization medium in which electrostatic charge is present, the olefin and/or the olefin and at least one or more other olefin(s) with at least one Ziegler-Natta catalyst comprised of a component comprising at least one transition metal and a co-catalyst comprising at least one organometallic compound, and tetrahydrofuran, wherein the tetrahydrofuran is present in an amount sufficient to reduce the electrostatic charge in the polymerization medium.

2. The process according to claim 1 wherein the at least one organometallic co-catalyst compound is a compound having the formula, $$X_nER_{3-n},$$ 

or mixtures thereof,
wherein
X is hydrogen, halogen, or mixtures of halogens, selected from fluorine, chlorine, bromine and iodine,
n ranges from 0 to 2, and
E is an element from Group 13 of the Periodic Table of Elements, and
R is a hydrocarbon group, containing from 1 to 100 carbon atoms and from 0 to 10 oxygen atoms, connected to the Group 13 element by a carbon or oxygen bond.

3. The process according to claim 2 wherein the organometallic co-catalyst compound is selected from the group consisting of trialkylaluminums, dialkylaluminum halides and alkylaluminum sesquihalides.

4. The process according to claim 3 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, the dialkylaluminum halide is selected from the group consisting of dimethylaluminum chloride, diethylaluminum chloride, dibutylaluminum chloride, diisobutylaluminum chloride, and the alkylaluminum sesquihalide is selected from the group consisting of ethylaluminum sesquichloride, ethylaluminum sesquichloride, n-butylaluminum sesquichloride and isobutylaluminum sesquichloride.

5. The process according to claim 4 wherein the trialkylaluminum is selected from the group consisting of trimethylaluminum and triethylaluminum.

6. The process according to claim 1 further comprising adding a halogenated hydrocarbon to the polymerization medium.

7. The process according to claim 6 wherein the halogenated hydrocarbon is selected from the group consisting of dichloromethane, chloroform, carbon tetrachloride, chlorofluoromethane, chlorodifluromethane, dichlorodifluoromethane, fluorodichloromethane, chlorotrifluoromethane, fluorotrichloromethane and 1,2-dichloroethane.

8. The process according to claim 7 wherein the halogenated hydrocarbon is chloroform.

9. The process according to claim 1 wherein the at least one transition metal is selected from Groups 4, 5, 6, 7, 8, 9 and 10 of the Periodic Table of the Elements, as defined herein.

10. The process according to claim 9 wherein the metal is selected from the group consisting of titanium, zirconium, vanadium and chromium.

11. The process according to claim 10 wherein the metal is titanium.

12. The process according to claim 1 further comprising the presence of magnesium and chlorine incorporated in the Ziegler-Natta catalyst.

13. The process according to claim 9 further comprising the presence of magnesium and chlorine incorporated in the Ziegler-Natta catalyst.

14. The process according to claim 1 further comprising the presence of an internal electron donor incorporated in the Ziegler-Natta catalyst.

15. The process according to claim 1 wherein the at least one transition metal and/or the at least one transition metal and the at least one organometallic co-catalyst compound of the Ziegler-Natta catalyst is supported on a carrier.

16. The process according to claim 15 wherein the carrier is selected from the group consisting of silica, alumina and mixtures thereof.

17. The process according to claim 6 wherein the halogenated hydrocarbon is added in a molar ratio of halogenated hydrocarbon to transition metal component of the Ziegler-Natta catalyst ranging from about 0.001:1 to about 100:1.

18. The process according to claim 1 wherein the organometallic co-catalyst compound is added in a molar ratio of co-catalyst to transition metal component of the Ziegler-Natta catalyst ranging from about 0.5:1 to about 100:1.

19. The process according to claim 18 wherein the molar ratio of organometallic co-catalyst compound to transition metal component of the Ziegler-Natta catalyst ranges from about 0.5:1 to about 50:1.

20. The process according to claim 1 wherein the tetrahydrofuran is added in a molar ratio of tetrahydrofuran to transition metal component of the Ziegler-Natta catalyst ranging from about 0.01:1 to about 100:1.

21. The process according to claim 20 wherein the molar ratio of tetrahydrofuran to transition metal component of the Ziegler-Natta catalyst ranges from about 0.1:1 to about 50:1.

22. The process according to claim 1 wherein the polymerization medium is gas phase.

23. The process according to claim 1 wherein the polymerization medium is slurry phase.

24. The process according to claim 1 wherein the olefin is ethylene and the at least one or more other olefin(s) is selected from the group consisting of olefins having 3 to 16 carbon atoms.

25. The process according to claim 24 wherein the at least one or more other olefin(s) is selected from the group consisting of 1-octene, 1-hexene, 4-methylpent-1-ene, 1-pentene, 1-butene and propylene.

26. The process according to claim 24 wherein the interpolymer resulting from the polymerization of ethylene and at least one or more olefin(s) comprises ethylene in an amount of at least about 50% by weight of the interpolymer.

27. The process according to claim 1 wherein the Ziegler-Natta catalyst comprises titanium, magnesium and chlorine.

28. The process according to claim 27 wherein the polymerization medium is gas phase.

29. A process for reducing electrostatic charge generated in the polymerization of an olefin and/or an olefin and at least one or more other olefin(s) in a polymerization medium in which electrostatic charge is present, in the presence of at least one Ziegler-Natta catalyst comprised of a component comprising at least one transition metal and a co-catalyst comprising at least one organometallic compound, comprising introducing into the polymerization medium tetrahydrofuran in an amount sufficient to reduce the electrostatic charge in the polymerization medium.

30. The process according to claim 29 wherein the at least one organometallic co-catalyst compound is a compound having the formula, $$X_nER_{3-n},$$

or mixtures thereof,
wherein
X is hydrogen, halogen, or mixtures of halogens, selected from fluorine, chlorine, bromine and iodine,
n ranges from 0 to 2, and
E is an element from Group 13 of the Periodic Table of Elements, and
R is a hydrocarbon group, containing from 1 to 100 carbon atoms and from 0 to 10 oxygen atoms, connected to the Group 13 element by a carbon or oxygen bond.

31. The process according to claim 30 wherein the organometallic co-catalyst compound is selected from the group consisting of trialkylaluminums, dialkylaluminum halides and alkylaluminum sesquihalides.

32. The process according to claim 31 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, the dialkylaluminum halide is selected from the group consisting of dimethylaluminum chloride, diethylaluminum chloride, dibutylaluminum chloride, diisobutylaluminum chloride, and the alkylaluminum sesquihalide is selected from the group consisting of ethylaluminum sesquichloride, ethylaluminum sesquichloride, n-butylaluminum sesquichloride and isobutylaluminum sesquichloride.

33. The process according to claim 32 wherein the trialkylaluminum is selected from the group consisting of trimethylaluminum and triethylaluminum.

34. The process according to claim 29 further comprising adding a halogenated hydrocarbon to the polymerization medium.

35. The process according to claim 34 wherein the halogenated hydrocarbon is chloroform.

36. The process according to claim 29 wherein the at least one transition metal is selected from Groups 4, 5, 6, 7, 8, 9 and 10 of the Periodic Table of the Elements, as defined herein.

37. The process according to claim 36 wherein the metal is selected from the group consisting of titanium, zirconium, vanadium and chromium.

38. The process according to claim 37 wherein the metal is titanium.

39. The process according to claim 29 further comprising the presence of magnesium and chlorine incorporated in the Ziegler-Natta catalyst.

40. The process according to claim 36 further comprising the presence of magnesium and chlorine incorporated in the Ziegler-Natta catalyst.

41. The process according to claim 29 further comprising the presence of an internal electron donor incorporated in the Ziegler-Natta catalyst.

42. The process according to claim 29 wherein the at least one transition metal and/or the at least one transition metal and the at least one organometallic co-catalyst compound of the Ziegler-Natta catalyst is supported on a carrier.

43. The process according to claim 42 wherein the carrier is selected from the group consisting of silica, alumina and mixtures thereof.

44. The process according to claim 34 wherein the halogenated hydrocarbon is added in a molar ratio of halogenated hydrocarbon to transition metal component of the Ziegler-Natta catalyst ranging from about 0.001:1 to about 100:1.

45. The process according to claim 29 wherein the organometallic co-catalyst compound is added in a molar ratio of co-catalyst to transition metal component of the Ziegler-Natta catalyst ranging from about 0.5:1 to about 100:1.

46. The process according to claim 45 wherein the molar ratio of organometallic co-catalyst compound to transition metal component of the Ziegler-Natta catalyst ranges from about 0.5:1 to about 50:1.

47. The process according to claim 29 wherein THF is added in a molar ratio of THF to transition metal component of the Ziegler-Natta catalyst ranging from about 0.01:1 to about 100:1.

48. The process according to claim 47 wherein the molar ratio of THF to transition metal component of the Ziegler-Natta catalyst ranges from about 0.1:1 to about 50:1.

49. The process according to claim 29 wherein the polymerization medium is gas phase.

50. The process according to claim 29 wherein the polymerization medium is slurry phase.

51. The process according to claim 29 wherein the olefin is ethylene and the at least one or more other olefin(s) is selected from the group consisting of olefins having 3 to 16 carbon atoms.

52. The process according to claim 51 wherein the at least one or more other olefin(s) is selected from the group consisting of 1-octene, 1-hexene, 4-methylpent-1-ene, 1-pentene, 1-butene and propylene.

53. The process according to claim 51 wherein the interpolymer resulting from the polymerization of ethylene and at least one or more olefin(s) comprises ethylene in an amount of at least about 50% by weight of the interpolymer.

54. The process according to claim 29 wherein the Ziegler-Natta catalyst comprises titanium, magnesium and chlorine.

55. The process according to claim 54 wherein the polymerization medium is gas phase.

* * * * *